US00RE50606E

(19) United States
(12) Reissued Patent
James

(10) Patent Number: US RE50,606 E
(45) Date of Reissued Patent: Sep. 30, 2025

(54) SELF-ADJUSTING SUN SHADE ASSEMBLY

(71) Applicant: Solbello, Inc., Wilmington, NC (US)

(72) Inventor: Paul T. James, Wrightsville Beach, NC (US)

(73) Assignee: Sobello, Inc., Wilmington, NC (US)

(21) Appl. No.: 18/367,224

(22) Filed: Sep. 12, 2023

Related U.S. Patent Documents

Reissue of:
(64) Patent No.: 11,596,211
Issued: Mar. 7, 2023
Appl. No.: 17/417,739
PCT Filed: Jun. 22, 2020
PCT No.: PCT/US2020/038920
§ 371 (c)(1),
(2) Date: Jun. 23, 2021
PCT Pub. No.: WO2021/040863
PCT Pub. Date: Mar. 4, 2021

U.S. Applications:
(60) Provisional application No. 62/892,700, filed on Aug. 28, 2019.

(51) Int. Cl.

| | |
|---|---|
| ***A45B 23/00*** | (2006.01) |
| ***A45B 25/02*** | (2006.01) |
| ***A45B 25/06*** | (2006.01) |
| ***A45B 25/10*** | (2006.01) |
| ***A45B 25/18*** | (2006.01) |

(52) U.S. Cl.
CPC ..... *A45B 23/00* (2013.01); *A45B 25/02* (2013.01); *A45B 25/06* (2013.01); *A45B 25/10* (2013.01); *A45B 25/18* (2013.01); *A45B 2023/0093* (2013.01); *A45B 2025/105* (2013.01)

(58) Field of Classification Search
CPC . A45B 2023/0012; A45B 23/00; A45B 25/02; A45B 25/06; A45B 25/10; A45B 25/18; A45B 2023/0093; A45B 2025/105; E04H 15/28; E04H 15/58; E04H 15/44; E04H 15/46; E04H 15/48
See application file for complete search history.

(56) References Cited

U.S. PATENT DOCUMENTS 3,070,107 A * 12/1962 Beatty ..... E04H 15/003 D30/118
3,075,536 A * 1/1963 Parker ..... E04H 15/003 D21/837

(Continued)

FOREIGN PATENT DOCUMENTS

FR 2717849 A1 * 9/1995 ..... A45B 23/00
WO WO-0211578 A2 * 2/2002 ..... A45B 11/00
WO WO-2025017335 A1 * 1/2025 ..... B63B 34/26

*Primary Examiner* — Terrence R Till
(74) *Attorney, Agent, or Firm* — Schwartz Law Firm, P.C.

(57) ABSTRACT

The presently disclosed subject matter is directed to a sun shade assembly. Particularly, the assembly includes a sail that releasably attaches to a pair of ribs, providing shade to the user. At least one support arm can be used to reinforce the ribs. A mast provides height to the assembly and includes an anchor that allows the assembly to be secured into a support surface (e.g., sand). The ribs and support arms rotate about the mast, thereby self-adjusting the direction of sail in response to the wind blowing. The assembly further includes a tension adjuster that can be tightened or loosed to control the rotation of the ribs and support arms in response to wind conditions.

32 Claims, 17 Drawing Sheets

(56) References Cited

U.S. PATENT DOCUMENTS

| | | | | | |
|---|---|---|---|---|---|
| 4,433,699 | A * | 2/1984 | Schultes | A45B 23/00 | 135/117 |
| 5,555,903 | A * | 9/1996 | Rizzotti | A45B 11/00 | 135/20.1 |
| 6,422,252 | B1 * | 7/2002 | Pilz | A45B 23/00 | 135/20.1 |
| 7,406,977 | B1 * | 8/2008 | Shires | E04H 15/26 | 135/121 |
| 9,051,756 | B1 * | 6/2015 | Jenkins | E04H 15/58 | |
| 10,099,751 | B1 * | 10/2018 | Greer | H02S 30/20 | |
| 11,219,286 | B2 * | 1/2022 | Cox | E04H 15/58 | |
| 2006/0278261 | A1 * | 12/2006 | Marcelli | A45B 25/22 | 135/98 |
| 2008/0196754 | A1 | 8/2008 | Saiz | | |
| 2012/0291830 | A1 * | 11/2012 | Crimi | E04H 15/58 | 135/117 |
| 2014/0041703 | A1 * | 2/2014 | Funston | E04H 15/54 | 135/121 |

* cited by examiner

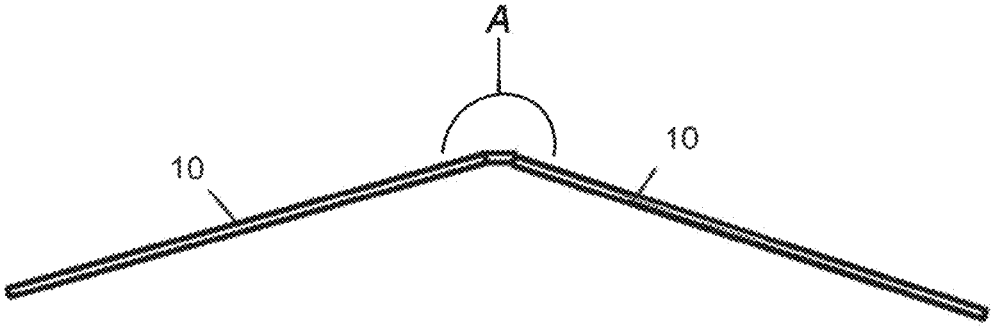
Fig. 2d
*Amended*

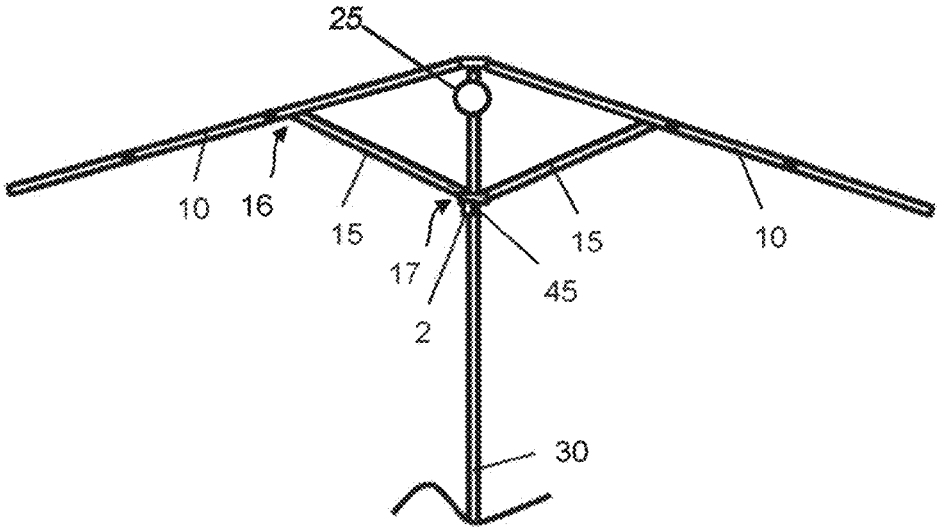
Fig. 4a
*Amended*

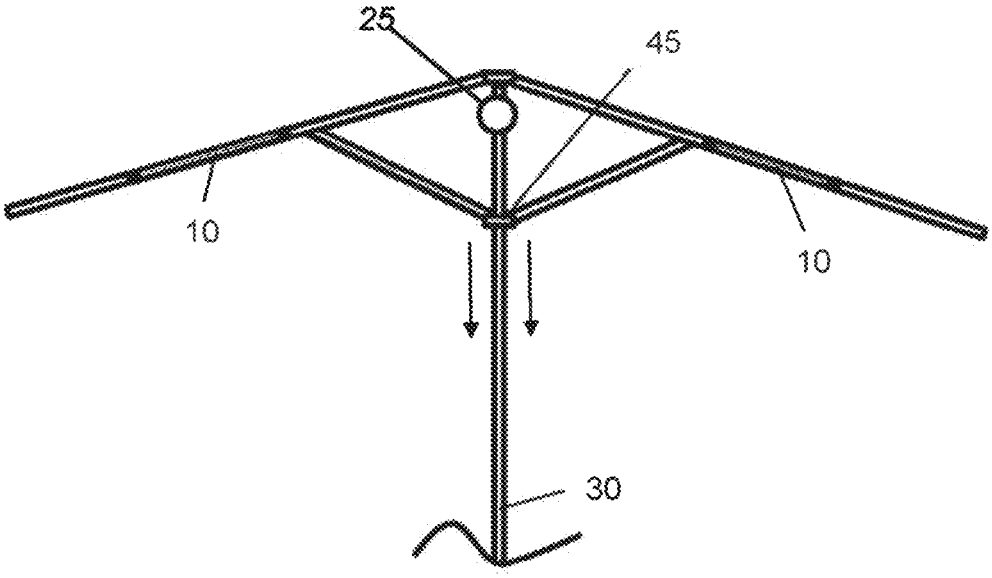
Fig. 4c
*Amended*

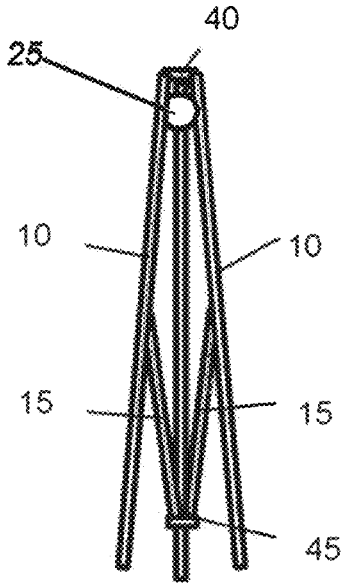
Fig. 4d
*Amended*

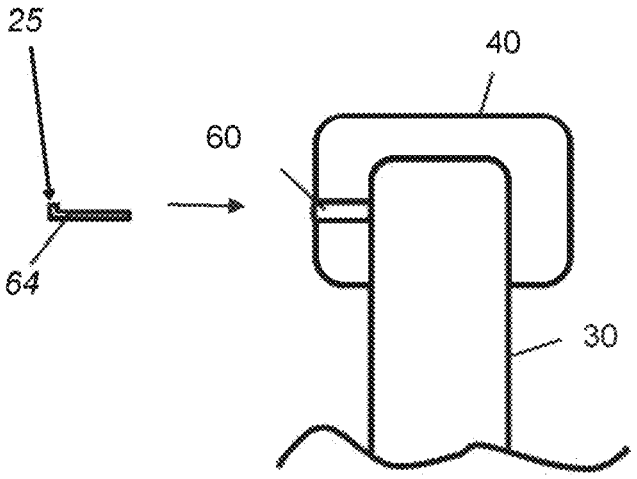
Fig. 7a
*Amended*

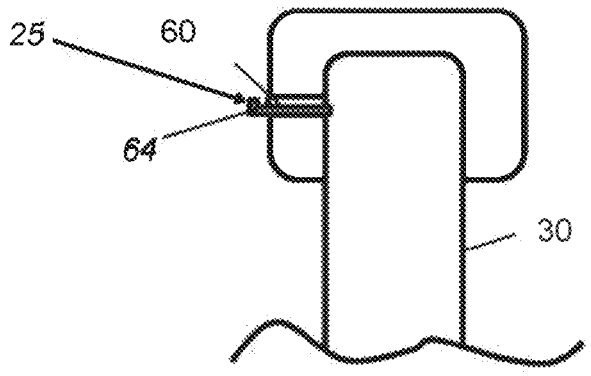
Fig. 7b
*Amended*
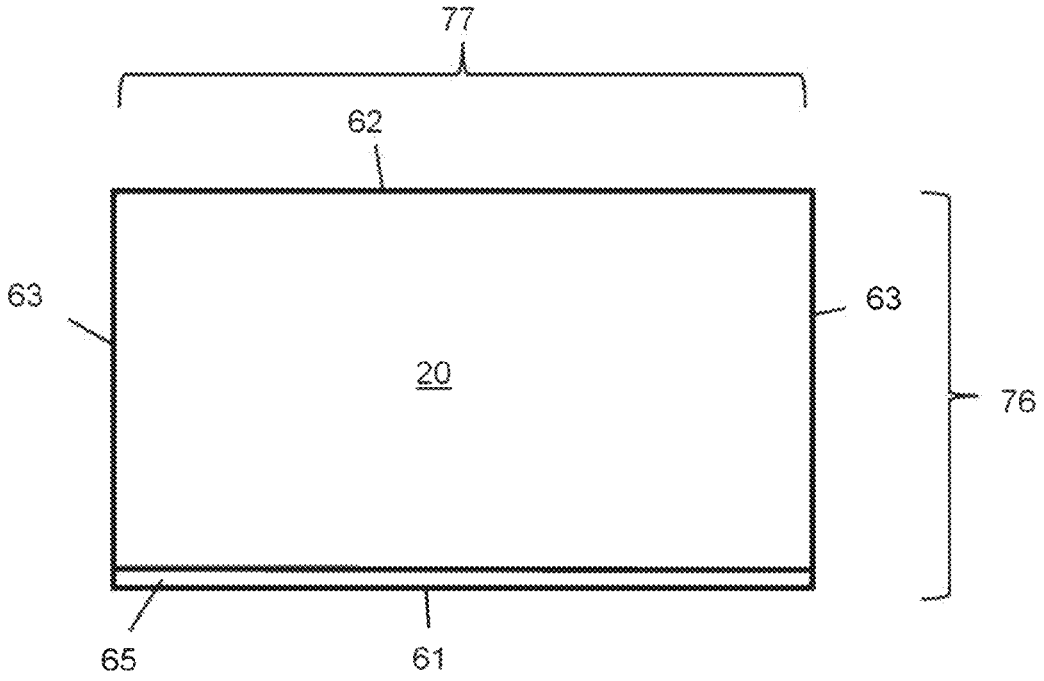
Fig. 8a
*Amended*

SELF-ADJUSTING SUN SHADE ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[The present application] *This is an application for the reissue of U.S. Pat. No. 11,596,211, which granted on Mar. 7, 2023 from U.S. patent application Ser. No. 17/417,739, filed Jun. 22, 2020, and which* claims the benefit of U.S. Provisional Patent Application No. 62/892,700, filed Aug. 28, 2019, the entire content of which is incorporated by reference herein.

TECHNICAL FIELD

The presently disclosed subject matter is directed to a self-adjusting sun shade assembly and to methods of making and the using the same.

BACKGROUND

Beach umbrellas are used to create an area shaded from the sunlight beneath the umbrella canopy. They are particularly useful at the beach where there is generally a lack of trees or roofed structures to provide shade. Because the skin of the beachgoer is largely exposed at the beach, there is a greater need to provide protection from harmful ultraviolet rays, which may cause sunburn or melanomas. Many beachgoers also require some form of shade to minimize heat discomfort. The shade and shelter provided by a beach umbrella is also useful in protecting the user's valuables and shielding perishable items from direct sunlight. Conventional beach umbrellas include a single central support pole with a pointed lower end that is inserted directly into the sand. Conventional umbrellas further include an overhead fabric covering attached to the support pole. However, the main problem with the canopy design of traditional umbrellas is that the position of the umbrella constantly shifts in response to wind gusts. As a result, the user must frequently readjust the umbrella to compensate for the shifts in movement. In addition, conventional umbrellas can easily tip over or be blown down the beach where they can cause hassle to the owner as well as injury to other beachgoers. Conventional umbrellas are also prone to wind breakage. It would therefore be beneficial to provide an umbrella with improved stability in response to the wind blowing. It would further be beneficial if the umbrella self-adjusted to the wind to prevent or reduce the likelihood of tipping over.

SUMMARY

In some embodiments, the presently disclosed subject matter is directed to a sun shade assembly (e.g., an assembly that provides shade from the sun). The assembly comprises a pair of ribs defined by a first end and a second end, wherein the first end of each rib is attached to a pivot cap. The assembly further includes a sail with a front edge comprising a channel sized and shaped to house each rib such that the ribs extend across the edge. The assembly includes a mast comprising a first end and a second end, wherein the first end is operably connected to the pivot cap, wherein the pivot cap can freely rotate about the mast. The assembly comprises at least one support arm with a first end and a second end, wherein the first end of the support arm is attached to a rib and the second end of the support arm is attached to a slider configured to move up and down the mast. The assembly comprises a tension adjuster that adjusts rotation of the pivot cap about the mast. The assembly comprises an anchor operably connected to the second end of the mast. The pivot cap, ribs, slider, and support arms are configured to rotate about the mast in response to blowing of the wind.

In some embodiments, the pivot cap rotates about the mast at an angle of about 0-360 degrees. In some embodiments, the pivot cap rotates about a top end of the mast (e.g., is configured to rotate about the top end of the mast).

In some embodiments, the ribs are configured at an angle of greater than 180 degrees relative to each other.

In some embodiments, one face of the pivot cap comprises a lock defined by a bridge comprising an opening and a slidable arm that moves to cover and expose the opening. A portion of sail material can be locked in between the bridge and slidable arm to lock it into position.

In some embodiments, the slider is configured as a collar that fits around the exterior circumference of the mast.

In some embodiments, the mast length is adjustable.

In some embodiments, the anchor is releasably attached to the second end of the mast.

In some embodiments, the anchor comprises an auger. The term "auger" refers to a member in which a spiral vane or multiple parallel vanes are provided about the perimeter of a shaft.

In some embodiments, the tension adjuster is configured to permit the pivot cap, slider, ribs, and support arms to freely rotate about the mast, not rotate about the mast, or any level of rotation therebetween. The pivot cap, slider, ribs, and support arms rotate as a single, attached unit.

In some embodiments, the sail channel comprises one or more apertures to facilitate insertion of the ribs into the channel.

In some embodiments, the sail channel comprises one or more apertures to allow direct contact between each rib and a corresponding support arm.

In some embodiments, the sail has a top face and a bottom face, and wherein the bottom face includes at least one conduit configured as a channel with an open mouth positioned adjacent to the channel, a closed back end, and a length parallel with the length of the sail.

In some embodiments, the sail has a top face and a bottom face and wherein at least one of the top or bottom faces comprises a coating.

In some embodiments, the sail has an opposed rear edge comprising an adjacent hem constructed from a durable material.

In some embodiments, the mast comprises at least one handle.

In some embodiments, the presently disclosed subject matter is directed to a method of using a sunshade. Particularly, the method comprises positioning the anchor of a sun shade assembly in a support surface. The sun shade assembly comprises: a pair of ribs defined by a first end and a second end, wherein the first end of each rib is attached to a pivot cap; a sail with a front edge comprising a channel sized and shaped to house each rib such that the ribs extend across the edge; a mast comprising a first end and a second end, wherein the first end is operably connected to the pivot cap, wherein the pivot cap can freely rotate about the mast;

at least one support arm with a first end and a second end, wherein the first end of the support arm is attached to a rib and the second end of the support arm is attached to a slider configured to move up and down the mast; a tension adjuster that adjusts rotation of the pivot cap about the mast; and an anchor operably connected to the second end of the mast. The method further includes adjusting the tension adjuster to achieve a desired amount of rotation of the pivot cap, ribs, support arms, slider, and sail relative to the non-movable mast. The sun shade assembly self-adjusts in response to the blowing of the wind.

In some embodiments, the tension adjuster can be adjusted to allow the pivot cap, slider, ribs, and support arms to freely rotate about the mast, not rotate about the mast, or any level of rotation therebetween.

In some embodiments, the sail has a top face and a bottom face, and wherein the bottom face includes at least one conduit configured as a channel with an open mouth positioned adjacent to the channel, a closed back end, and a length parallel with the length of the sail.

In some embodiments, one face of the pivot cap comprises a lock defined by a bridge comprising and opening and a slidable arm that moves to cover and expose the opening.

In some embodiments, the sail has an opposed rear edge comprising an adjacent hem constructed from a durable material.

BRIEF DESCRIPTION OF THE DRAWINGS

FIG. 2d is a front plan view illustrating the angle of separation of two ribs in accordance with some embodiments of the presently disclosed subject matter.

FIG. 4a is a top plan view of a slider configurated around a mast in accordance with some embodiments of the presently disclosed subject matter.

FIGS. 4c-4d are front plan views illustrating use of a slider to adjust the position of one or more support arms in accordance with some embodiments of the presently disclosed subject matter.

FIG. 6a is a front plan view of a mast in accordance with some embodiments of the presently disclosed subject matter.

FIGS. 7a and 7b are cross-sectional views of a tension adjuster in use in accordance with some embodiments of the presently disclosed subject matter.

FIG. 8a is a top plan view of a sail in accordance with some embodiments of the presently disclosed subject matter.

DETAILED DESCRIPTION

Figure 1:
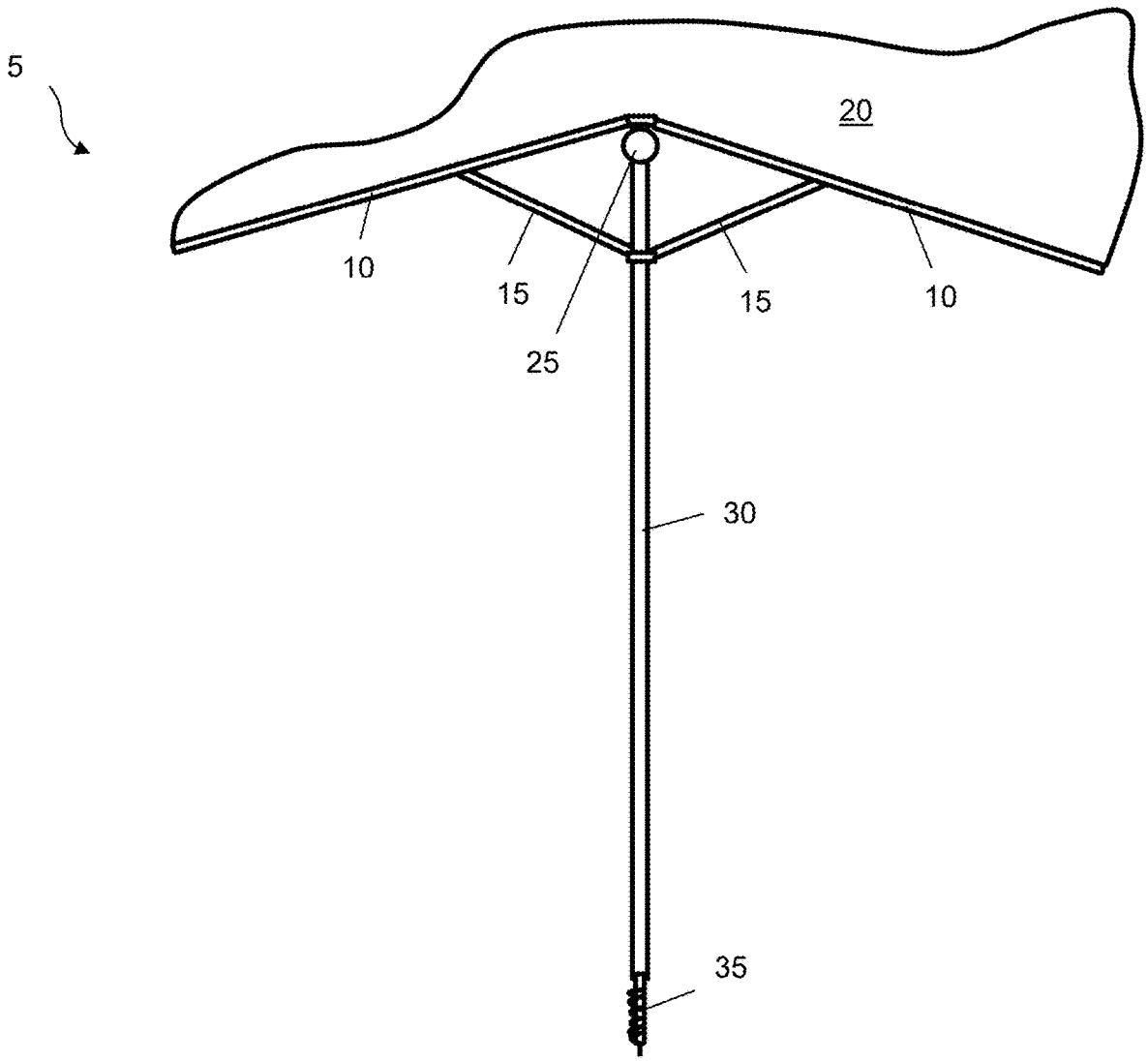
FIG. 1 is a front plan view of an sun shade assembly in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates one embodiment of sun shade assembly 5. Particularly, the assembly includes sail 20 that releasably attaches to a pair of ribs 10, providing shade to the user. At least one support arm 15 can be used to reinforce ribs 10. Mast 30 provides height to the assembly and includes anchor 35 *located at its bottom end* that allows the assembly to be secured into a support surface (e.g., sand). The ribs and support arms rotate about the mast, thereby self-adjusting the direction of sail 20 in response to the wind blowing, as described in more detail below. The assembly further includes tension adjuster 25 (*e.g., FIGS. 7a and 7b*) that can be tightened or loosed to control the rotation of the ribs and support arms in response to wind conditions. *The tension adjuster 25 is also shown diagrammatically in FIGS. 1, 4a, 4c, and 4d, and is discussed further below.*

Figure 2A:
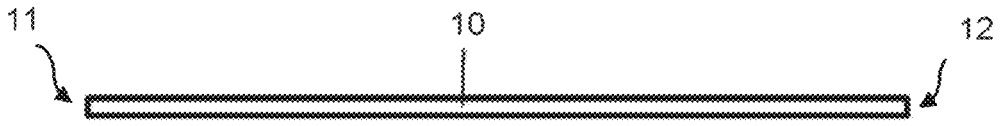
FIG. 2a is a front plan view of an assembly rib in accordance with some embodiments of the presently disclosed subject matter.
Figure 2B:
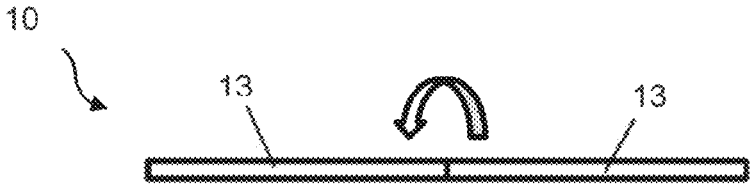
FIGS. 2b and 2c are front plan views illustrating the folding of a rib in accordance with some embodiments of the presently disclosed subject matter.
Figure 2C:
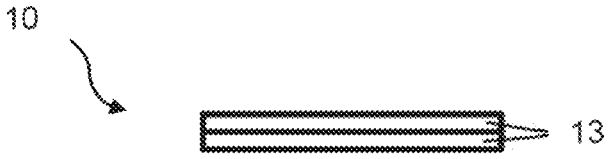

FIG. 2a illustrates one embodiment of rib 10. As shown, the rib includes first end 11 and second end 12. In some embodiments, the ribs can each include one or more joints 13 that can be folded, allowing the ribs to be easily stored when not in use, as illustrated in FIGS. 2b and 2c. Any mechanism can be used to fold the ribs, such as (but not limited to) hinges, joints, and the like. For example, a living hinge, a barrel hinge, spring hinge, butterfly hinge, flag hinge, H hinge, or any other pivotable member can be used.

The term "living hinge" refers to a hinge integrally formed with two opposite portions of the same material. The term "barrel hinge" refers to a sectional barrel secured by a pivot. The term "spring hinge" refers to a spring-loaded hinge that applies force to secure the hinge in an open or closed configuration. "Butterfly hinge" refers to dovetail or parliament hinges. The term "flag hinge" refers to hinges that can be taken apart with a fixed pin on one leaf, manufactured in a right-hand or left-hand configuration. An "H hinge" refers to a hinge shaped like an "H."

However, in some embodiments, the ribs are non-foldable and remain in the fully extended state, even during storage.

Figure 2E:
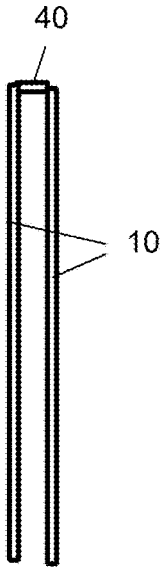
FIG. 2e is a front plan view of folded ribs separated by a pivot cap in accordance with some embodiments of the presently disclosed subject matter.

The ribs can be slightly offset relative to each other (e.g., are not 180 degrees apart). The offset nature allows the ribs to compensate for stretching of the sail. For example, in some embodiments, the angle [16] *"A"* between ribs 10 can be about 180-300 degrees, as shown in FIG. 2d. Thus, the angle between ribs 10 can be at least/no more than about 180, 185, 190, 195, 200, 205, 210, 215, 220, 225, 230, 235, 240, 245, 250, 255, 260, 265, 270, 275, 280, 285, or 290 degrees. It should be appreciated that angle 16 is not limited and can be larger or smaller than the range set forth herein. The ribs can be fully folded, such as in a storage position, as shown in FIG. 2e.

Figure 2F:
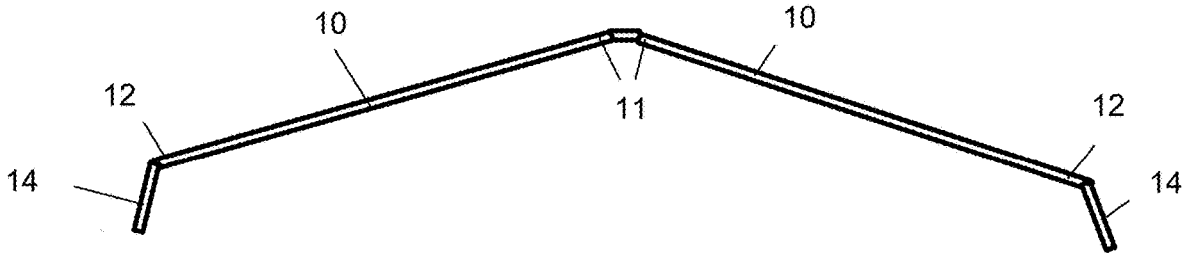
FIG. 2f is a front plan view illustrating ribs comprising extension in accordance with some embodiments of the presently disclosed subject matter.

In some embodiments, rib 10 can include extension 14 as shown in FIG. 2f. The extensions provide a decorative look the assembly when the sail is attached. Each extension can be attached to rib second end 12 using any desired method (e.g., adhesive, welding, clips, clamps, hinges, screws, bolts, magnets, etc.). It should be appreciated that extension 14 is optional.

Ribs 10 can have any desired length. For example, suitable lengths can include (but are not limited to) about 3-10 feet. Thus, the ribs can have a length of at least about (or no more than about) 3, 3.5, 4, 4.5, 5, 5.5, 6, 6.5, 7, 7.5, 8, 8.5, 9, 9.5, or 10 feet. However, the presently disclosed subject matter is not limited the length of each rib can be larger or smaller than the range given herein.

Figure 3A:
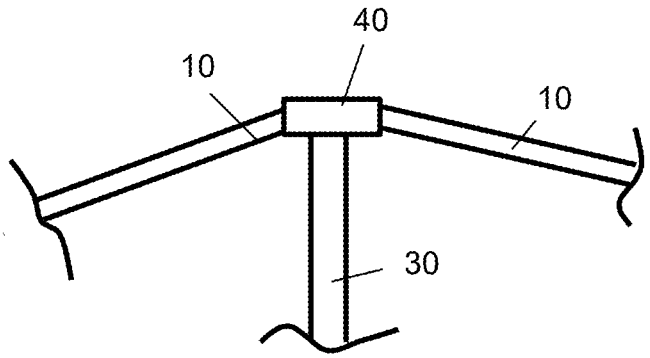
FIG. 3a is a front plan view of a pivot cap in accordance with some embodiments of the presently disclosed subject matter.
Figure 3B:
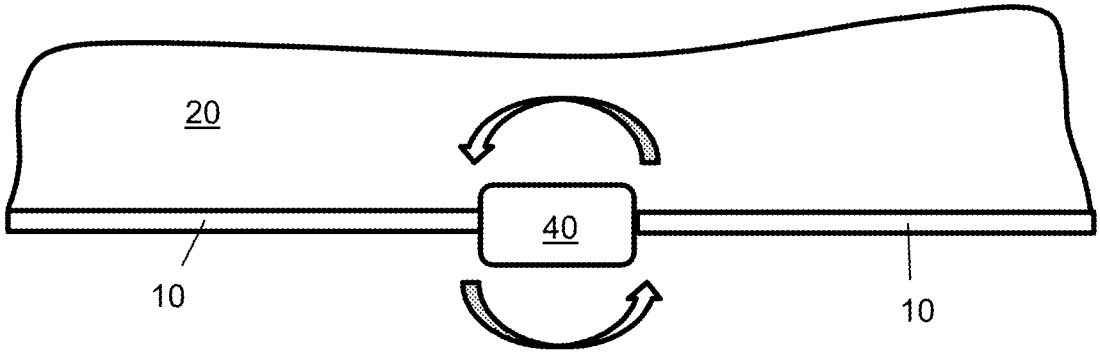
FIG. 3b is a top plan view of a pivot cap in use in accordance with some embodiments of the presently disclosed subject matter.

The ribs are joined using pivot cap 40, as illustrated in FIG. 3a. The pivot cap joins ribs 10 and enables rotation of the ribs about mast 30. Thus, the pivot cap can freely rotate about the mast in response to wind conditions, as discussed in more detail below and as shown in FIG. 3b. The ribs can rotate in a clockwise or counterclockwise direction, depending on the wind direction. It should be appreciated that the ribs can join to pivot cap 40 using any mechanism (e.g., screws, bolts, clips, hinges, welding, adhesive, magnets, and the like).

Figure 3C:
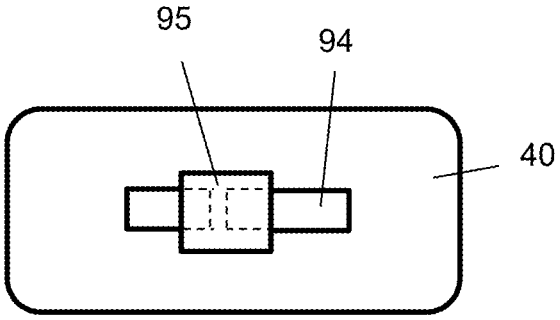
FIG. 3c is a top plan view of a pivot cap comprising a bridge and sliding arm in accordance with some embodiments of the presently disclosed subject matter.
Figure 3D:
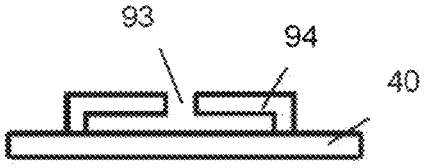
FIGS. 3d-3g are side plan view of a pivot cap bridge and arm in use in accordance with some embodiments of the presently disclosed subject matter.
Figure 3E:
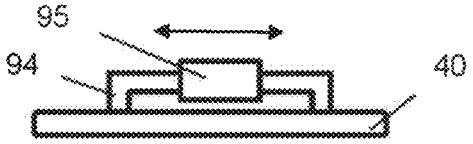
Figure 3F:
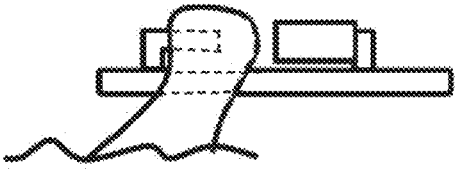
Figure 3G:
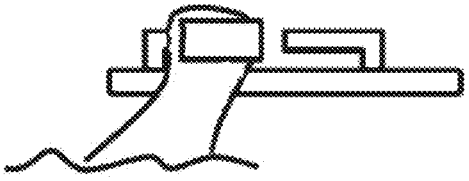

In some embodiments, one face of pivot cap 40 includes bridge 94 comprising opening 93 and slidable arm 95 that can be used to releasably lock the sail into proper position, as shown in FIGS. 3c-3e. Particularly, a portion of the sail can be inserted into opening [94] *93*. Arm 95 can then be slid to trap the portion of the sail over the bridge, as shown in FIGS. 3f and 3g. Thus, a portion of the sail is trapped between the bridge and the arm. To release the sail, the arm can be slid to expose opening 93, thereby allowing the sail to be removed. The term "bridge" refers to any device that has a raised portion with an opening configured therein. In some embodiments, the arm can fully surround at least a segment of the raised bridge portion.

As shown in FIG. 4a, the assembly can include one or more support arms 15 that provide stability to the ribs, allowing the assembly to support the sail even in high wind conditions. Each support arm includes first end 16 attached to rib 10 and second end 17 attached to slider 45. The support arms can be attached to the rib and slider using any known mechanism, such as the use of adhesives, welding, magnets, mechanical elements (screws, bolts, clips), and the like. In some embodiments, the support arms are hingedly attached to the ribs and/or slider to allow for easy transitioning between positions.

Figure 4B:
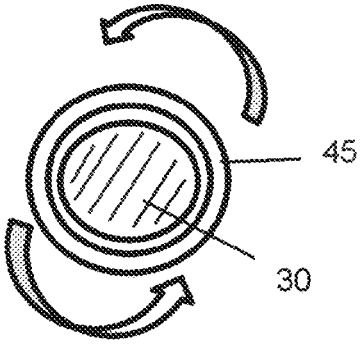
FIG. 4b is a front plan view of a mast comprising a slider in accordance with some embodiments of the presently disclosed subject matter.

Slider 45 can move along mast 30 to fold or unfold the ribs and support arms. In some embodiments, the slider can be configured as a collar that fits about the outer circumference of mast 30, as shown in FIG. 4b. The inner circumference of slider 45 is therefore at least slightly larger than the outer circumference of mast 30. In this way, the slider and support arms can rotate freely about the mast. Particularly, the mast remains in a stationary position, while the slider (and attached support arms and ribs) rotate in response to the wind blowing. The slider can rotate in any direction (e.g., clockwise and counterclockwise).

The slider can include retention element 2 to keep it from sliding down the length of the mast. The retention element can include any device that retains the slider in a desired position on the mast, such as (but not limited to) a removable ledge with an outer circumference larger than the inner circumference of the slider, clips, pins, clasps, and the like. The retention element therefore locks the slider at a desired location along the mast. In this way, the ribs and support arms can be maintained in the open configuration without the slider slipping to a lower position. Likewise, the slider can also be locked in a lower "storage" configuration along the mast (or any location therebetween).

The slider can also be used to fold the ribs and support arms, such as when the assembly is transitioned to a storage configuration (e.g., not in use). When the slider is in an upper position on the mast, the support arms and ribs are unfolded outward and thus sail 20 is unfolded, as shown in FIG. 4a. When the slider moves to a lower position on the mast, the support arms and ribs are folded to the storage position, as shown in FIGS. 4c and 4d. Therefore, the slider can travel on the mast in an upward direction to extend the ribs and support arms to a fully open configuration. The slider can also move downward along the mast to transition the ribs and support arms into a folded position.

Ribs 10 and support arms 15 can have any desired cross-sectional shape. For example, the ribs and support arms can be configured with a circular, oval, square, rectangular, triangular, pentagonal, hexagonal, octagonal, heart, diamond, or abstract cross-sectional shape.

Figure 5A:
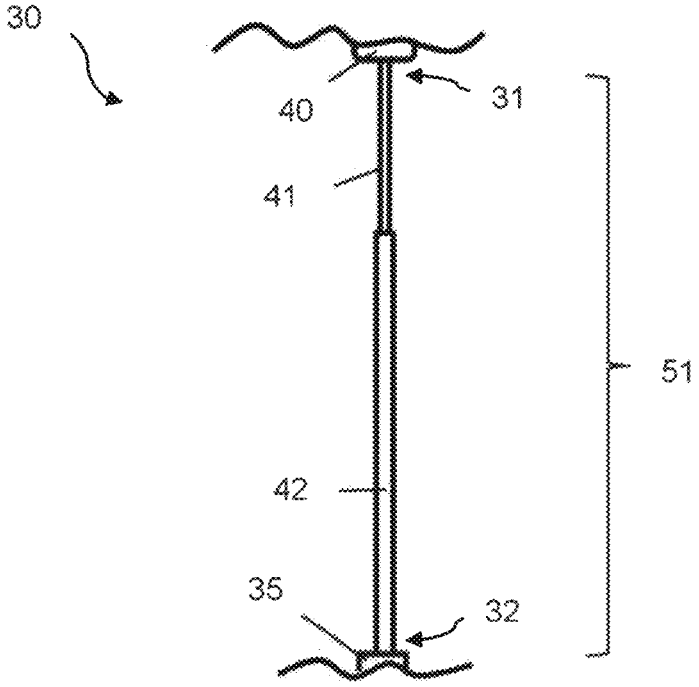
FIG. 5a is a front plan view of a mast in accordance with some embodiments of the presently disclosed subject matter.

As set forth above, assembly 5 comprises mast 30 that reinforces ribs 10 and support arms 15, as well as provides height to the assembly, as shown in FIG. 5a. The mast further provides a base about which the ribs can rotate via pivot cap 40. The mast includes first end 31 operatively attached to pivot cap 40 and second end 32 attached to anchor 35. The mast can be permanently or releasably attached to the pivot cap and/or anchor.

Figure 5B:
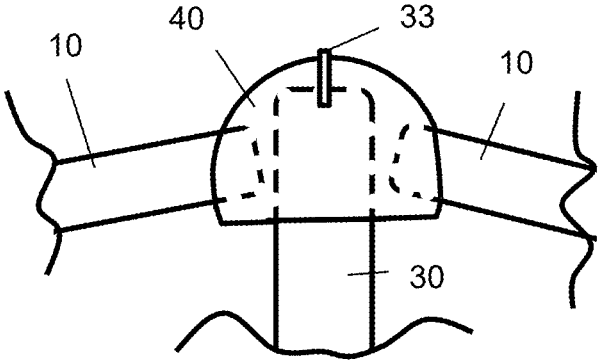
FIG. 5b is a front plan view of a pivot cap

The pivot cap is attached to mast first end 31 using any known method. For example, a screw, bolt, or other element 33 can be threaded through the pivot cap, extending into the mast as shown in FIG. 5b. In this way, the pivot cap attaches to the mast and still can rotate freely in a clockwise or counterclockwise direction. The pivot cap can have any desired shape and is not limited to the embodiment shown in FIG. 5b. Attachment of the pivot cap to the mast is further not limited.

Figure 5C:
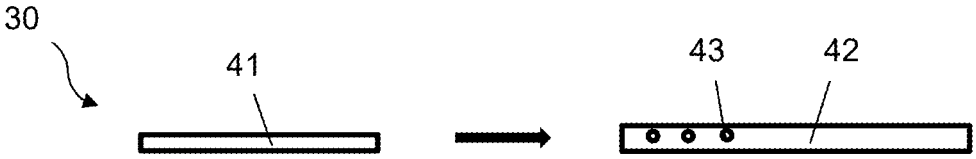
FIGS. 5c and 5d are side plan views illustrating a telescoping mast in accordance with some embodiments of the presently disclosed subject matter.
Figure 5D:
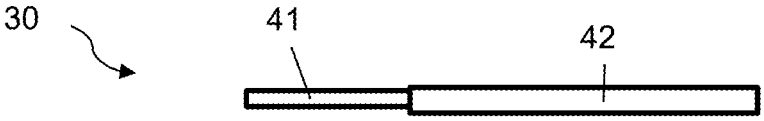

Mast 30 includes length 51 that in some embodiments can be adjusted as desired by the user. For example, the mast can include telescoping inner and outer tubes 41, 42. The term "telescoping" refers to a mechanical action of at least two longitudinal bodies of congruent cross-sections sliding relative to each other along a common longitudinal axis. As shown in FIGS. 5c-5d, inner tube 41 can be at least partially slidably disposed into the interior of outer tube 42. Specifically, the diameter of the outer tube is larger than the diameter of the inner tube such that the inner tube can be housed within the interior of the outer tube. The mast can include any number of telescoping tubes. A locking pin can pass through one or more holes 43 configured in the outer tube to hold the mast at the desired length. Alternatively, the inner and outer tubes can cooperate with a locking screw to secure the mast height. It should be appreciated that the length of the mast can be locked using any known element, such as friction fit, screw fit, snap-fit, screws, bolts, and the like.

It should further be appreciated that the length of the mast can be adjusted using any known mechanism and is not limited to a telescoping arrangement. For example, the mast can include a plurality of segments that can be added or removed as desired to achieve a suitable height. In other embodiments, the length of mast 30 is not adjustable.

Mast 30 can have any desired cross-sectional shape. For example, the mast can be configured with a circular, oval, square, rectangular, triangular, pentagonal, hexagonal, octagonal, heart, diamond, or abstract cross-sectional shape.

Second end 32 of the mast is operatively connected to anchor 35. The term "anchor" broadly refers to any element that provides weight and/or a mechanism by which to secure assembly 5 into a support surface (e.g., sand). The anchor can be permanently attached to mast 30 using adhesives, welding, and the like. Alternatively, the anchor can be releasably attached to the mast using any of a wide variety of mechanical elements (e.g., screw knob 37). A releasably attached anchor allows for the replacement of the anchor depending on use conditions (e.g., beach sand versus grass or rock).

Figure 6:
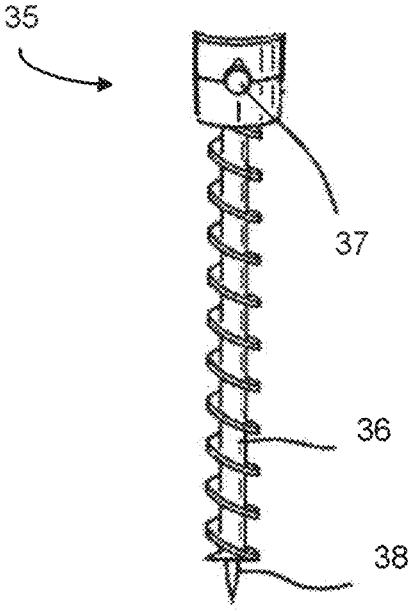
FIG. 6 is a perspective view of an anchor in accordance with some embodiments of the presently disclosed subject matter.

FIG. 6 illustrates one embodiment of anchor 35 comprising auger 36 that can be configured as any type of spike, helical corkscrew, or shaft optionally having a threaded portion capable of being turned and embedding itself into a support surface (e.g., sand at a beach). Lower end 38 of the auger can be configured as a spike or pointed end to initiate insertion of the anchor into the support surface. Because auger 36 is inserted into a support surface, it does not rotate and remains in the inserted position until the user desires to remove it. Likewise, the mast does not rotate in response to wind conditions due to its attachment to the anchor.

The disclosed assembly further includes tension adjuster 25 that allows a user to adjust the tension on the pivot cap *40* relative to the mast *30* easily and safely. In this way, a user can alter the amount of rotation ribs 10, support arms 15 and slider 45 have about mast 30 in response to wind conditions. The tension adjuster *25* can be generally located *within or* adjacent to the pivot cap *40*. The tension adjuster [is also attached to] *25 engages the* mast 30 using any known mechanism (e.g., screws, bolts, clips, etc.).

As described above, the pivot cap (and attached ribs, slider, and support arms) can freely rotate about the mast in response to the wind blowing. The tension adjuster can be tightened as desired by the user (e.g., when the wind is shifting back and forth) to stop or limit rotation of the pivot cap (and ribs, support arm, and slider) about the mast to maintain a more balanced assembly. For example, in some embodiments, the tension adjuster can be loosened to allow the pivot cap, ribs, support arms, and slider to freely rotate (e.g., 360 degrees) about the mast. In other embodiments, the pivot cap, ribs, slider, and support arms have a more limited freedom to rotate (e.g., it takes a stronger gust of wind to rotate). In some embodiments, the tension adjuster can be fully tightened such that the ribs, slider, and support arms cannot rotate relative to the mast.

Tension adjuster 25 can have any desired configuration that allows a user to control the level of movement of the [tension] *pivot* cap *40* relative to the mast *30*. For example, in some embodiments, the tension adjuster *25* can include passageway 60 with actuator [65] *64* (e.g., lever or screw) capable of contacting pivot cap 40, as shown in FIGS. 7a and 7b. Adjusting the actuator *64* through the passageway *60* will increase or decrease the tension on the pivot cap *40*. Specifically, if the actuator *64* is tightened to fully contact the pivot cap *40*, the pivot cap *40* will be incapable of moving relative to the mast *30*. Alternatively, if the actuator *64* is loosened such that it does not fully contact or press against the mast *30*, the pivot cap *40* is free to rotate. Any degree of actuator tightening can therefore adjust the level of pivot cap rotation.

The tension adjuster can have any known configuration and is not limited to the embodiment described above. For example, the tension adjuster can apply a force parallel, at an angle, or perpendicular to the tension it creates. The force can be generated by any known method, such as fixed displacement, stretching/compression of a spring, changing the volume of a gas, hydraulic pressure, or gravity. Tension adjuster 25 can therefore include any device that applies a force to create or maintain tension.

Further, actuator [65] *64* can have any known configuration, such as (but not limited to) a lever, wrench, key, screw, handle, knob, bolt, and the like.

The ribs, mast, support arms, pivot cap, tension adjuster, and anchor can be constructed from any desired material, such as (but not limited to) metal (e.g., aluminum, steel, brass, stainless steel, copper), plastic, wood, stone, or combinations thereof. In some embodiments, each element is constructed from the same material. In other embodiments, one element can be constructed from a material that differs from at least one other element.

Figure 8B:
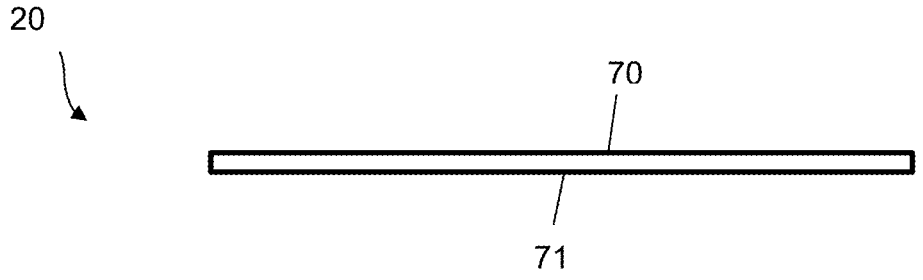
FIG. 8b is a front plan view of a sail in accordance with some embodiments of the presently disclosed subject matter.

Assembly 5 further includes sail 20 that cooperates with ribs 10. As shown in FIGS. 8a and 8b, the sail can include *proximal* front edge 61, *unrestrained free* rear edge 62, and a pair of side edges 63. The sail further includes top face 70 and bottom face 71. *In exemplary embodiments, the entire surface area of the sail 20 is unrestrained from its proximal front edge 61 to the free rear edge 62, such that the sail 20 unfurls in response to blowing of the wind when the support arms 15 and ribs 10 are unfolded outward as shown in FIG. 4a. The support arms 15 and ribs 10 rotate together with the sail 20 to the direction of the blowing wind.*

Figure 8C:
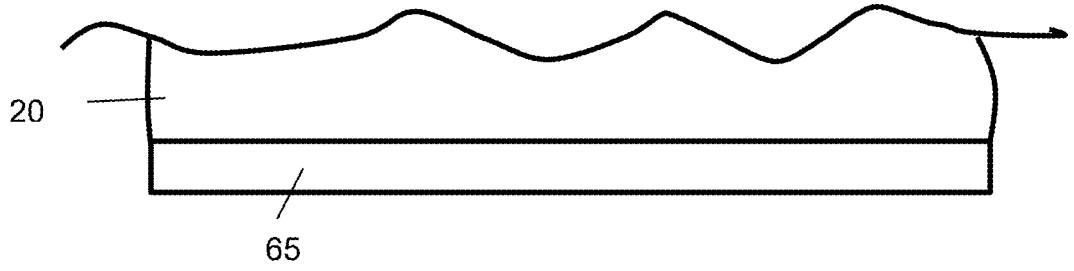
FIG. 8c is a fragmentary top plan view of a sail channel in accordance with some embodiments of the presently disclosed subject matter.

Front edge 61 comprises channel 65 sized and shaped to house each rib 10, as shown in FIG. 8c. The front edge can be a straight edge, a curved edge, or have any known configuration. The ribs can be removed from channels 65 if desired by the user (e.g., to repair the sail or replace with a new sail). Channels 65 can be formed in the sail using any known method. For example, in some embodiments, the channel can be formed through sewing, welding, and the like. Such methods are well known in the art.

Figure 8D:
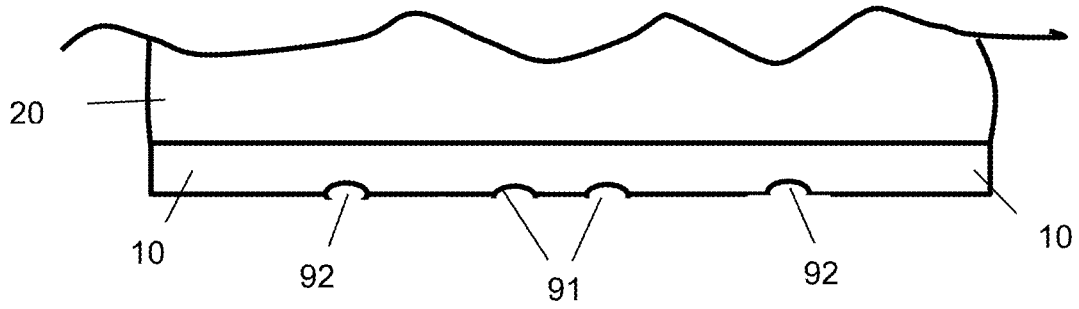
FIG. 8d is a fragmentary top plan view of a sail channel comprising a plurality of apertures in accordance with some embodiments of the presently disclosed subject matter.

In some embodiments, each channel includes one or more apertures. For example, each channel can include apertures 91 sized and shaped to allow each rib to be inserted into channel 65. The channel can further include one or more apertures 92 sized and shaped to allow each support arm to connect with the appropriate rib, as shown in FIG. 8d. Apertures 91, 92 can have any desired size and/or shape so long as they allow for insertion of a rib and/or connection of a support arm with a rib (e.g., through one or more screws, clips, and/or the like). Further, apertures 91, 92 can be positioned at any suitable position in the channel.

Figure 8E:
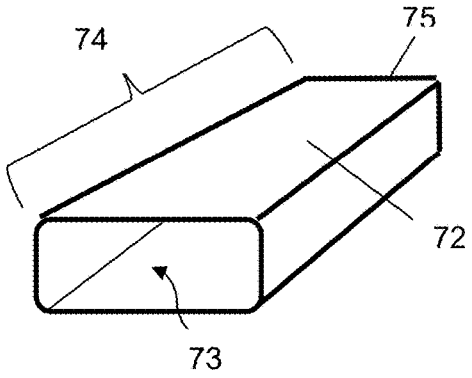
FIG. 8e is a perspective view illustrating a sail conduit in accordance with some embodiments of the presently disclosed subject matter.
Figure 8F:
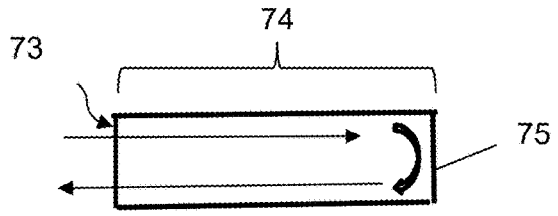
FIG. 8f is a side plan view of a sail conduit in accordance with some embodiments of the presently disclosed subject matter.

Optionally, bottom face 71 of the sail can include at least one closed conduit 72 that provides a passageway for the flow of the wind during use. FIG. 8e illustrates one embodiment of conduit 72 comprising open mouth 73 positioned adjacent to the sail front edge, length 74 and closed end 75. FIG. 8f illustrates the flow of wind (represented by the arrows) as it enters open mouth 73, hits closed end 75 and then exits the open mouth. Conduit 72 provides added support for the sail, preventing or reducing excess flapping in the wind.

Figure 8G:
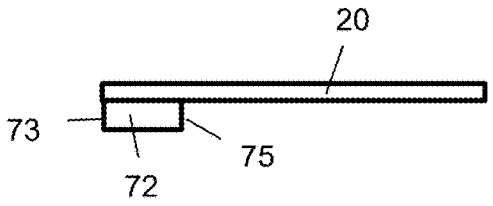
FIGS. 8g-8i are side plan views of sail conduits in accordance with some embodiments of the presently disclosed subject matter.
Figure 8H:
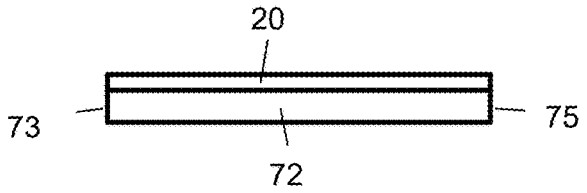
Figure 8I:
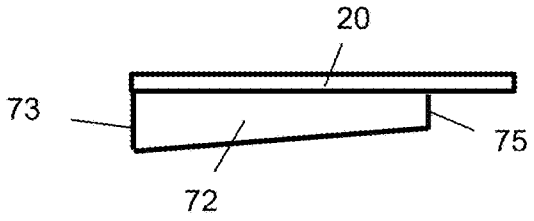

In some embodiments, the length of the conduit is the same as the length of the sail (i.e., the conduit extends the full length of the sail). In other embodiments, the conduit is configured to be shorter than the length of the sail, as shown in FIGS. 8g and 8h. In some embodiments, the thickness of the conduit can taper as it reaches closed end 75, as shown in FIG. 8i.

The conduit can have any cross-sectional shape, such as (but not limited to) square, rectangular, circular, oval, triangular, and the like.

In some embodiments, the sail can be formed as a single portion of material. In other embodiments, the sail can be constructed from two or more pieces of material joined together, such as by welding or sewing.

The sail can be configured in any desired shape, such as square, rectangular, rounded, oval, triangular, pentagonal, abstract, and the like. In some embodiments, the sail can include at least one straight edge to accommodate the channel.

The sail can further have any desired dimensions, such as length 77 and/or width 76 of about 3-20 feet (e.g., at least/no more than about 3, 4, 5, 6, 7, 8, 9, 10, 11, 12, 13, 14, 15, 16, 17, 18, 19, or 20 feet). In some embodiments, the sail can have an area of about 10-100 $ft^2$ (e.g., at least/no more than about 10, 15, 20, 25, 30, 35, 40, 45, 50, 55, 60, 65, 70, 75, 80, 85, 90, 95, or 100 $ft^2$). However, the sail can be configured with dimensions outside the range given above. The term "length" refers to the distance in the longitudinal direction. The term "width" refers to the dimension perpendicular to the length.

Sail 20 can have any desired thickness, such as about 1 inch or less. Thus, the sail can have a thickness of about 1, 0.9, 0.8, 0.7, 0.6, 0.5, 0.4, 0.3, 0.2, 0.1, 0.01, 0.001 inches or less. However, the presently disclosed subject matter is not limited and the sail can have thickness of greater or less than the range given above.

Sail 20 can be constructed from any desired lightweight material. The term "lightweight material" refers to any material that is able to be lifted and carried by the wind (e.g., a wind speed of at least about 2-3 mph). Suitable materials can therefore include (but are not limited to) nylon, polyester, vinyl, rayon, canvas, acrylic fabric, cotton, or combinations thereof.

In some embodiments, the material(s) used to construct the sail can have a UPF (ultraviolet protection coefficient) rating of about 30 or more in accordance with ASTM D6544, incorporated by reference herein.

Figure 9A:
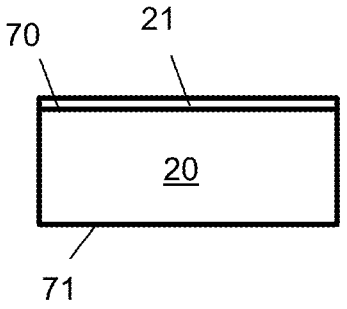
FIGS. 9a-9c are cross-sectional views of sail coating arrangements in accordance with some embodiments of the presently disclosed subject matter.
Figure 9B:
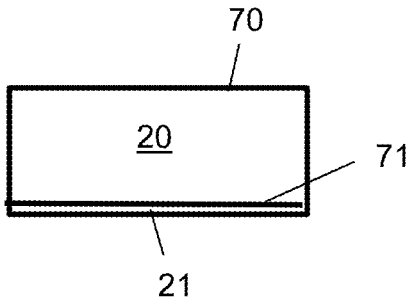
Figure 9C:
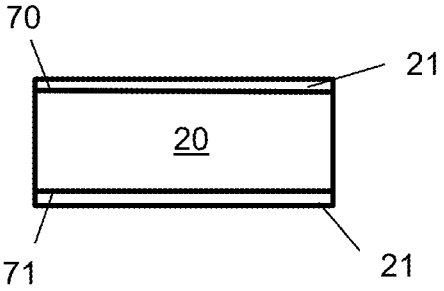

As shown in the cross-sectional views of FIGS. 9a-9c, sail 20 can include coating 21 to reduce the noise level when the sail is moving in the wind. The coating can be positioned on the sail top and/or bottom surfaces. The coating can span the entire top and/or bottom surface or only a portion thereof.

In addition to coating 21, the sail can optionally be calendared and/or treated with the application of heat/pressure to aid in the reduction of noise. The term "calendaring" refers to a method of passing the sail between calendar rolls at high temperature and/or pressure.

Coating 21 can comprise any material that would serve to reduce the amount of noise and/or movement of sail 20. Suitable materials can therefore include (but are not limited to) urethane polyurethane, plastic (e.g., polyethylene), or combinations thereof. Coating 21 can have any thickness, such as about 0.0001 inches to about 0.1 inches. In some embodiments, the coating can impart a waterproof or water-resistant quality to sail 20. The term "waterproof" refers to a material that is impervious to water. The term "water-resistant" refers to the ability of a material to resist the entry of water to some degree but not entirely.

Figure 9D:
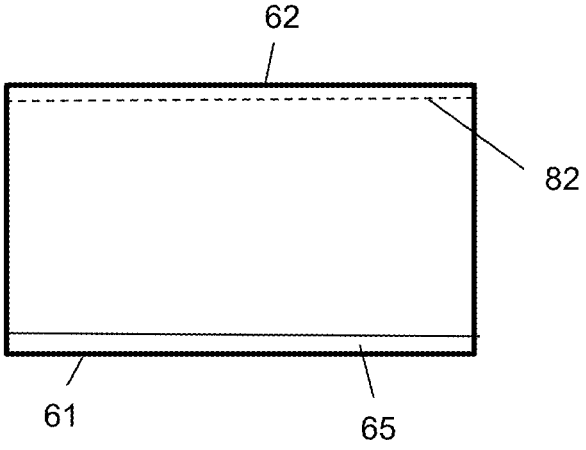
FIG. 9d is a top plan view of a sail with a rear hem in accordance with some embodiments of the presently disclosed subject matter.

In some embodiments, sail 20 can include hem 82 sewn or otherwise applied at or adjacent to rear edge 62, as shown in FIG. 9d. Hem 82 can be sewn with a durable material (e.g., monofilament nylon thread) to reduce the pliability of the sail, which aids in noise reduction and in the reduction of excess flapping in the wind. In some embodiments, hem 82 is in addition to any rear edge hem used to construct the sail (e.g., the rear edge can include an additional hem). It should be appreciated that hem 82 can be configured at any desired location.

Figure 10A:
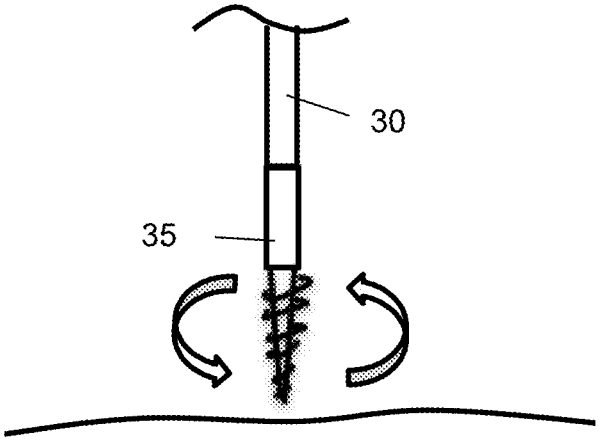
FIGS. 10a and 10b illustrate one method of inserting an anchor into a support surface in accordance with some embodiments of the presently disclosed subject matter.
Figure 10B:
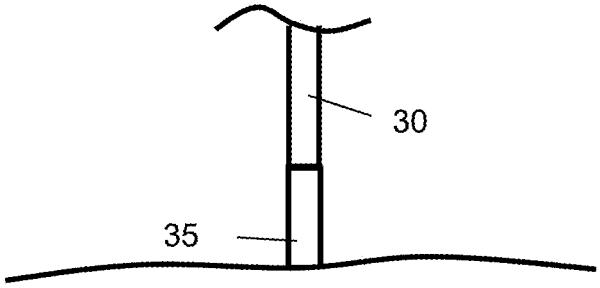
Figure 10C:
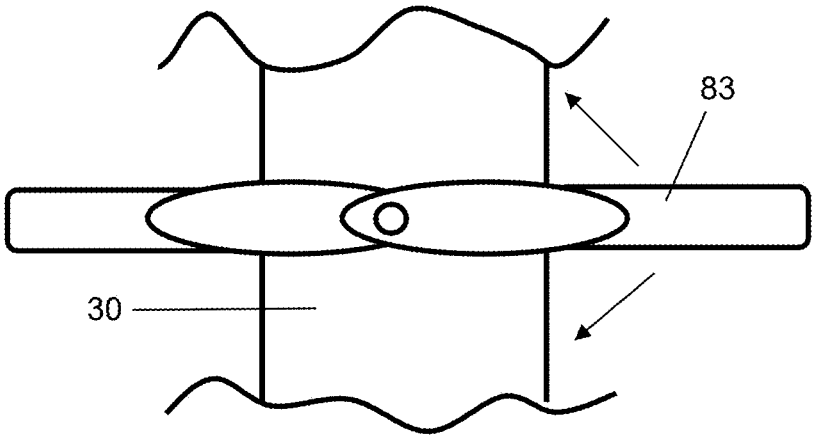
FIG. 10c is a front plan view of mast handles in accordance with some embodiments of the presently disclosed subject matter.

In use, the disclosed umbrella assembly can be used to provide shade to one or more users. Anchor 35 is positioned in a support surface, such as sand at the beach. The anchor can be inserted into the ground using a twisting motion, which allows the auger to be easily buried, as shown in FIGS. 10a and 10b. In some embodiments, the mast can be manually rotated to insert the auger into the ground. In other embodiments, mast 30 can include one or more handles 83 that fold out to aid in screwing the auger into the ground, as illustrated in FIG. 10c. In some embodiments, handles 83 can rotate up and down, flush with the mast as shown by the arrows. Thus, the handles fold into the mast when not in use and can be easily folded out when desired to insert the auger into a support surface. It should be appreciated that the handles can have any desired configuration.

Mast 30 can then be extended to a desired length to accommodate one or more users and their belongings. For example, inner and outer tubes 41 and 42 can be adjusted as needed to a desired length. In other embodiments, the mast is of a single length and need only be positioned and attached to the anchor.

Figure 10D:
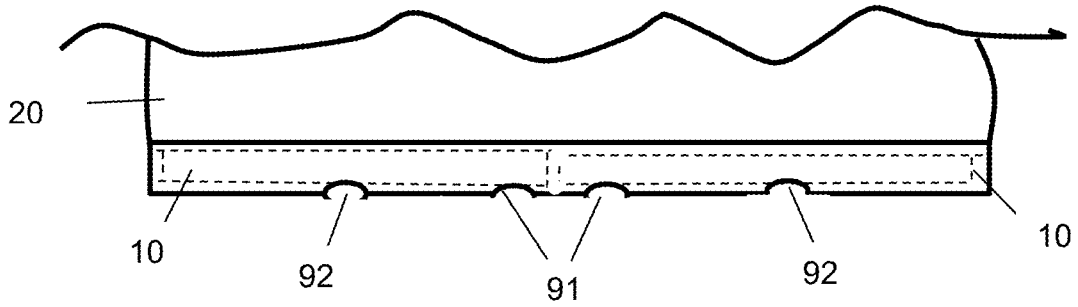
FIG. 10d is a fragmentary top plan view of a sail channel comprising ribs in accordance with some embodiments of the presently disclosed subject matter.

Ribs 10 can then be inserted into channel 65 of the sail. In some embodiments, each rib is inserted into channel aperture 91 for proper placement in the channel. It should be appreciated that aperture 91 can be positioned at any location in channel 65. For example, in some embodiments, each aperture 91 is positioned adjacent to the center of the channel (e.g., about 1-10 inches from the center point of the channel). Once the ribs are inserted into channel 65, apertures 92 are properly positioned to allow support arms 15 to be attached to the ribs, as shown in FIG. 10d. Particularly, the apertures provide an opening in the sail to allow the support arms to directly attach to the ribs. In this way, the support arms can be easily attached to the ribs.

Figure 10E:
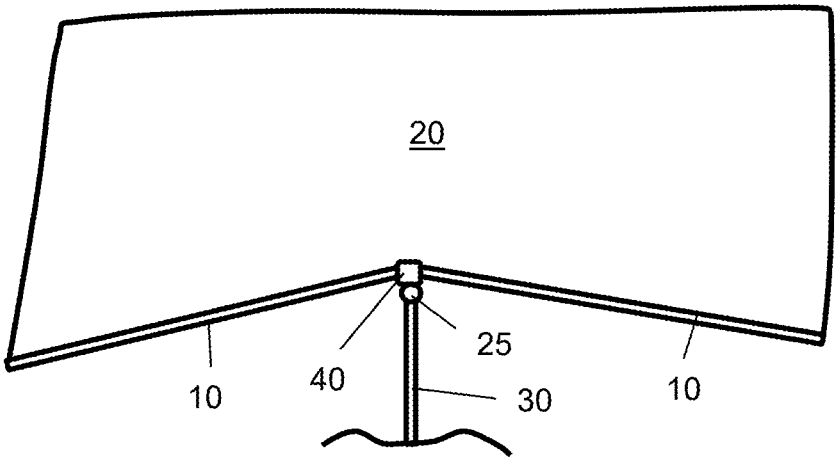
FIG. 10e is a front plan view of a sail positioned on ribs and a mast in accordance with some embodiments of the presently disclosed subject matter.

The sail can then be secured into position via bridge 94 and arm 95 on the pivot cap, as shown in FIG. 10e. For example, in some embodiments, the portion of the sail positioned between apertures 91 can be inserted into the bridge opening, and the arm then slid over to trap the sail material in position. In this way, the sail does not significantly shift out of proper position during use.

Figure 10F:
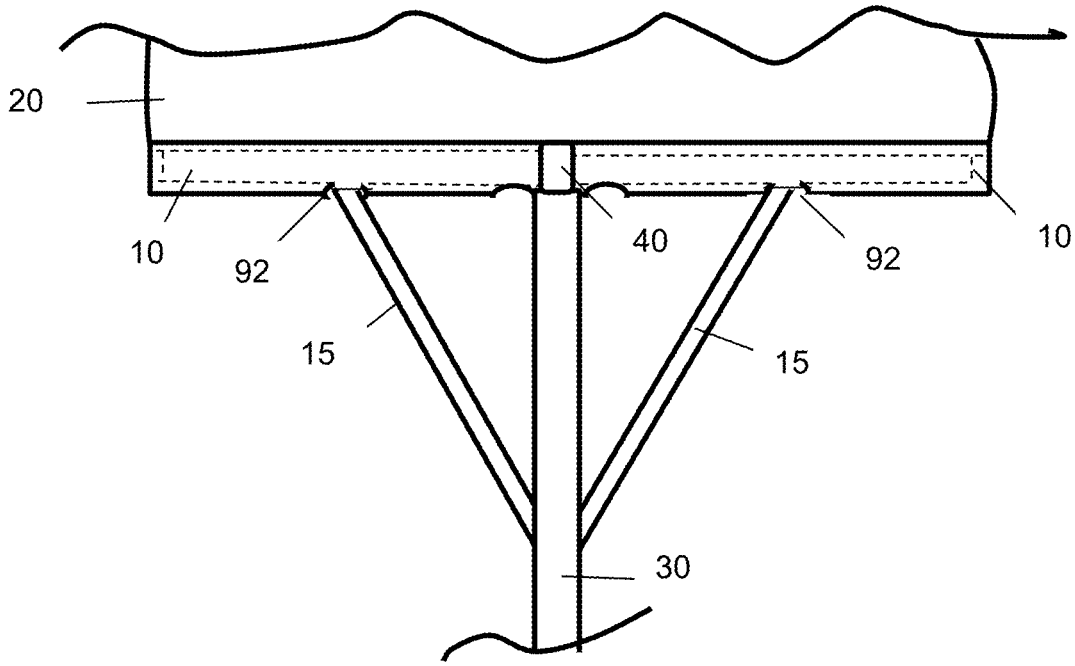
FIG. 10f is a front plan view of an assembly with side arms attached to the mast and ribs in accordance with some embodiments of the presently disclosed subject matter.

The support arms can then be attached to the ribs through channel apertures 92, as shown in FIG. 10f. Any known mechanism to secure the support arms to the ribs can be used. It should be appreciated that the opposing side of the support arms are secured to mast 30.

It should be appreciated that the steps included above can be performed in any order.

Figure 10G:
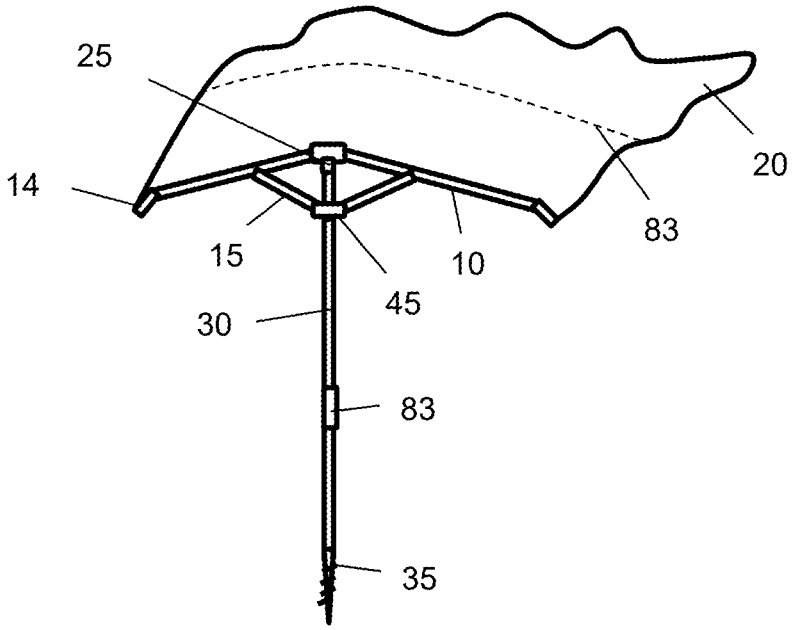
FIG. 10g is a front plan view of an assembly with a sail extended in the direction of the wind in accordance with some embodiments of the presently disclosed subject matter.
Figure 10H:
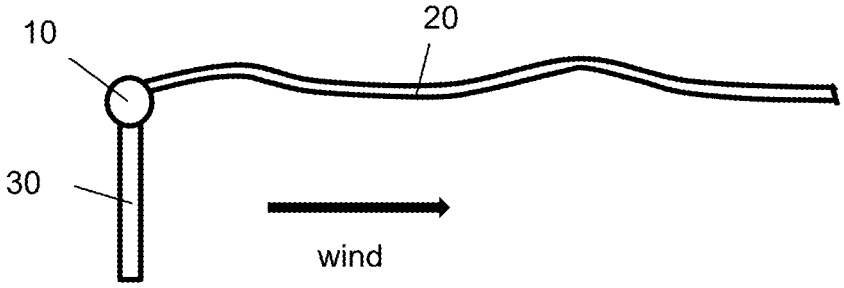
FIG. 10h is a side plan view of a sail extended in the direction of the wind in accordance with some embodiments of the presently disclosed subject matter.

If desired by the user, the tension adjuster can be set to lock the position of the ribs (e.g., no movement relative to the mast) or to limit movement. As the wind blows, the sail will move in response, blowing and extending outward providing shade to the user, as shown in FIGS. 10g and 10h. In some embodiments, the sail requires a wind speed of at least 2-3 miles per hour to flap or extend into the wind.

Because the support can rotate and adjust in response to the wind, the assembly has a reduced likelihood of falling over as a result heavy winds and/or when the wind shifts directions. Specifically, when the wind shifts direction, the sail will self-adjust (e.g. the pivot cap, ribs, sail, support arm, and slider rotate about the non-movable mast in response to the wind blowing and changing direction). In addition, because the sail rotates relative to the mast it prevents loosening the auger position and thereby causing failure of the assembly.

The disclosed assembly therefore offers many advantages over prior art systems. For example, because the sail consistently blows in response to the wind, the user's views are not blocked as is common with prior art umbrellas. As a result, users can keep an eye on children and the water at all times.

Further, the disclosed assembly allows the wind to self-adjust the direction of ribs 10 and sail 20, saving the user the time and hassle of manually adjusting the assembly.

In addition, the assembly frame is designed to not fall over if the wind stops or changes direction by more than 90 degrees.

The frame of the assembly (e.g. mast) does not catch the wind. If the mast falls over, it typically falls straight to the ground and does not tumble down the beach.

The disclosed assembly is capable of being quickly assembled. Users can easily set up the umbrella assembly in about 40 seconds or less. Likewise, the assembly can be quickly and easily disassembled in about 40 seconds or less.

Current assemblies commonly make use of sandbags, requiring users to fill the bags with sand to weigh down the umbrella, which is messy, time consuming, and can be hazardous if no shovel is available. Further, if wet sand is used, it is even more difficult to fill the bags.

Assembly 5 comprises a single mast, so it is universally permitted on beaches where tents are not.

The mast is typically not in the middle of the umbrella sitting area, thereby providing adding convenience to the user.

The disclosed assembly is quiet compared to other umbrellas and sun shades. Specifically, sail 20 does not loudly flap in the wind. Rather the sail stays extended by consistently floating in the direction of the wind.

Further, the disclosed system acts as an effective seagull deterrent. Because the sail is constantly changing directions in response to the wind, birds are deterred and tend to keep their distance.

As described above, although several embodiments of the present invention have been described for illustrative purposes, those skilled in the art will appreciate that various modifications, additions, and substitutions are possible without departing from the scope and spirit of the invention as disclosed in the accompanying claims.

What is claimed is:

[1. A sun shade assembly comprising:

a pair of ribs defined by a first end and a second end, wherein the first end of each rib is attached to a pivot cap;

a sail with a front edge comprising a channel sized and shaped to house each rib such that the ribs extend across the edge;

a mast comprising a first end and a second end, wherein the first end is operably connected to the pivot cap, wherein the pivot cap can freely rotate about the mast;

at least one support arm with a first end and a second end, wherein the first end of the support arm is attached to a rib and the second end of the support arm is attached to a slider configured to move up and down the mast; and an anchor operably connected to the second end of the mast;

wherein the pivot cap, ribs, slider, and support arms are configured to rotate about the mast in response to blowing of the wind.]

[2. The assembly of claim 1, wherein the pivot cap rotates about the mast at an angle of about 0-360 degrees.]

[3. The assembly of claim 1, wherein the ribs are configured at an angle of greater than 180 degrees relative to each other.]

[4. The assembly of claim 1, wherein one face of the pivot cap comprises a lock defined by a bridge comprising and opening and a slidable arm that moves to cover and expose the opening.]

[5. The assembly of claim 1, wherein the slider is configured as a collar that fits around the exterior circumference of the mast.]

[6. The assembly of claim 1, wherein the anchor is releasably attached to the second end of the mast.]

[7. The assembly of claim 1, wherein the sail channel comprises one or more apertures to facilitate insertion of the ribs into the channel.]

[8. The assembly of claim 1, wherein the sail channel comprises one or more apertures to allow direct contact between each rib and a corresponding support arm.]

[9. The assembly of claim 1, wherein the sail has a top face and a bottom face, and wherein the bottom face includes at least one conduit configured as a channel with an open mouth positioned adjacent to the channel, a closed back end, and a length parallel with the length of the sail.]

[10. The assembly of claim 1, wherein the sail has a top face and a bottom face and wherein at least one of the top or bottom faces comprises a coating.]

[11. The assembly of claim 1, wherein the sail has an opposed rear edge comprising an adjacent hem constructed from a durable material.]

[12. The assembly of claim 1, wherein the mast comprises at least one handle for gripping the mast.]

[13. The assembly of claim 1, further comprising a tension adjuster that adjusts rotation of the pivot cap about the mast.]

[14. The assembly of claim 13, wherein the tension adjuster is configured to permit the pivot cap, slider, ribs, and support arms to freely rotate about the mast, not rotate about the mast, or any level of rotation therebetween.]

[15. A method of using a sunshade, the method comprising:

positioning the anchor of a sun shade assembly in a support surface, wherein the sun shade assembly comprises:

a pair of ribs defined by a first end and a second end, wherein the first end of each rib is attached to a pivot cap;

a sail with a front edge comprising a channel sized and shaped to house each rib such that the ribs extend across the edge;

a mast comprising a first end and a second end, wherein the first end is operably connected to the pivot cap, wherein the pivot cap can freely rotate about the mast;

at least one support arm with a first end and a second end, wherein the first end of the support arm is attached to a rib and the second end of the support arm is attached to a slider configured to move up and down the mast; and an anchor operably connected to the second end of the mast;

wherein the sun shade assembly self-adjusts in response to the blowing of the wind.]

[16. The method of claim 15, wherein the sail has a top face and a bottom face, and wherein the bottom face includes at least one conduit configured as a channel with an open mouth positioned adjacent to the channel, a closed back end, and a length parallel with the length of the sail.]

[17. The method of claim 15, wherein one face of the pivot cap comprises a lock defined by a bridge comprising and opening and a slidable arm that moves to cover and expose the opening.]

[18. The method of claim 15, wherein the sail has an opposed rear edge comprising an adjacent hem constructed from a durable material.]

[19. The method of claim 15, wherein the sunshade assembly further comprises a tension adjuster that adjusts rotation of the pivot cap about the mast, and wherein the method further includes adjusting the tension adjuster to achieve a desired amount of rotation of the pivot cap, ribs, support arms, slider, and sail relative to the non-movable mast.]

[20. The method of claim 19, wherein the tension adjuster can be adjusted to allow the pivot cap, slider, ribs, and support arms to freely rotate about the mast, not rotate about the mast, or any level of rotation therebetween.]

*21. A sun shade assembly comprising:*

*a pair of ribs defined by a first end and a second end, wherein the first end of each rib is attached to a pivot cap;*

*a sail with a front edge comprising a channel sized and shaped to house each rib such that the ribs extend across the edge;*

*a mast comprising a first end and a second end, wherein the first end is operably connected to the pivot cap, wherein the pivot cap can freely rotate about the mast;*

*at least one support arm with a first end and a second end, wherein the first end of the support arm is attached to a rib and the second end of the support arm is attached to a slider configured to move up and down the mast; and*

*an anchor operably connected to the second end of the mast;*

*wherein the pivot cap, ribs, slider, and support arms are configured to rotate about the mast in response to blowing of the wind.*

*22. The assembly of claim 21, wherein the ribs are configured at an angle of greater than 180 degrees relative to each other.*

*23. The assembly of claim 21, wherein one face of the pivot cap comprises a lock defined by a bridge comprising and opening and a slidable arm that moves to cover and expose the opening.*

*24. The assembly of claim 21, wherein the slider is configured as a collar that fits around the exterior circumference of the mast.*

*25. The assembly of claim 21, wherein the anchor is releasably attached to the second end of the mast.*

*26. The assembly of claim 21, wherein the sail channel comprises one or more apertures to facilitate insertion of the ribs into the channel.*

*27. The assembly of claim 21, wherein the sail channel comprises one or more apertures to allow direct contact between each rib and a corresponding support arm.*

*28. The assembly of claim 21, wherein the sail has a top face and a bottom face, and wherein the bottom face includes at least one conduit configured as a channel with an open mouth positioned adjacent to the channel, a closed back end, and a length parallel with the length of the sail.*

*29. The assembly of claim 21, wherein the sail has a top face and a bottom face and wherein at least one of the top or bottom faces comprises a coating.*

*30. The assembly of claim 21, wherein the sail has an opposed rear edge comprising an adjacent hem constructed from a durable material.*

*31. The assembly of claim 21, wherein the mast comprises at least one handle for gripping the mast.*

*32. The assembly of claim 21, further comprising a tension adjuster that adjusts rotation of the pivot cap about the mast.*

*33. The assembly of claim 32, wherein the tension adjuster is configured to permit the pivot cap, slider, ribs, and support arms to freely rotate about the mast, not rotate about the mast, or any level of rotation therebetween.*

*34. A method of using a sunshade, the method comprising:*

*positioning an anchor of a sun shade assembly in a support surface, wherein the sun shade assembly comprises:*

*a pair of ribs defined by a first end and a second end, wherein the first end of each rib is attached to a pivot cap;*

*a sail with a front edge comprising a channel sized and shaped to house each rib such that the ribs extend across the edge;*

*a mast comprising a first end and a second end, wherein the first end is operably connected to the pivot cap, wherein the pivot cap can freely rotate about the mast;*

*at least one support arm with a first end and a second end, wherein the first end of the support arm is attached to a rib and the second end of the support arm is attached to a slider configured to move up and down the mast; and*

*the anchor operably connected to the second end of the mast;*

*wherein the sun shade assembly self-adjusts in response to the blowing of the wind.*

*35. The method of claim 34, wherein the sail has a top face and a bottom face, and wherein the bottom face includes at least one conduit configured as a channel with an open mouth positioned adjacent to the channel, a closed back end, and a length parallel with the length of the sail.*

*36. The method of claim 34, wherein one face of the pivot cap comprises a lock defined by a bridge comprising and opening and a slidable arm that moves to cover and expose the opening.*

*37. The method of claim 34, wherein the sail has an opposed rear edge comprising an adjacent hem constructed from a durable material.*

*38. The method of claim 34, wherein the sunshade assembly further comprises a tension adjuster that adjusts rotation of the pivot cap about the mast, and wherein the method further includes adjusting the tension adjuster to achieve a desired amount of rotation of the pivot cap, ribs, support arms, slider, and sail relative to the non-movable mast.*

*39. The method of claim 38, wherein the tension adjuster can be adjusted to allow the pivot cap, slider, ribs, and support arms to freely rotate about the mast, not rotate about the mast, or any level of rotation therebetween.*

*40. A sun shade assembly comprising:*

*a mast configured to extend upwardly from a supporting surface;*

*a pair of pivoted ribs carried by said mast and configured to rotate relative to the supporting surface, and said pivoted ribs adapted to lift outwardly from said mast at respective pivot points into an unfolded condition and to lower at respective pivot points from the unfolded condition to a folded condition alongside said mast;*

*a cap located at a top end of said mast, and wherein the first ends of said pivoted ribs are attached to said cap;*

*a sail having a proximal edge secured to each of said pivoted ribs, and an unrestrained free edge opposite the proximate edge;*

*whereby said sail is unfolded by lifting said pivot ribs outwardly from said mast from the folded condition into the unfolded condition such that the unrestrained free edge of said sail unfurls in response to blowing of the wind, and wherein said sail and ribs rotate together to a direction of the blowing wind; and*

*a tension adjuster adapted for adjusting pivot tension of said cap, thereby controlling rotation of said sail and ribs in response to blowing of the wind.*

*41. The assembly of claim 40, wherein said cap is adapted to rotate about said mast, such that said sail and pivoted ribs when unfolded rotate together at an angle from about 0 to 360 degrees in response to blowing of the wind.*

*42. The assembly of claim 40, and comprising an anchor located at a bottom end of said mast.*

*43. The assembly of claim 40, and comprising at least one handle for gripping said mast.*

*44. A sun shade assembly comprising:*

*a mast configured to extend upwardly from a supporting surface, and having a top end and a bottom end;*

*at least one rib located proximate the top end of said mast, and configured to rotate relative to the supporting surface;*

*a sail having a proximal edge secured to said rib and an unrestrained free edge adapted to unfurl in response to blowing of the wind, and wherein an entire surface area of said sail is unrestrained from the proximal edge to the free edge; and*

*when unfurled, said sail and rib are adapted to rotate together to a direction of the blowing wind.*

*45. The assembly of claim 44, wherein said at least one rib is attached to a cap located at the top end of said mast.*

*46. The assembly of claim 45, further comprising a tension adjuster adapted for adjusting pivot tension of said cap, thereby controlling rotation of said sail and rib in response to blowing of the wind.*

*47. The assembly of claim 44, and comprising an anchor located at the bottom end of said mast.*

*48. The assembly of claim 44, and comprising at least one handle for gripping said mast.*

*49. A sun shade assembly comprising:*

*a mast configured to extend upwardly from a supporting surface, and having a top end and a bottom end;*

*a pair of pivoted ribs pivotably attached proximate the top end of said mast, and configured to rotate relative to the supporting surface;*

*a sail having a proximal edge defining a channel sized and shaped to receive each of said pivoted ribs, and an unrestrained free edge adapted to unfurl in response to blowing of the wind;*

*a slider configured to move up and down said mast, and operatively actuating said pivoted ribs such:*

*(i) that raising said slider on said mast causes said pivoted ribs to open outwardly from a folded condition into an unfolded condition thereby unfolding said sail, such that when unfolded said sail unfurls in response to blowing of the wind and rotates together with said pivoted ribs to a direction of the blowing wind; and*

*(ii) lowering said slider on said mast causes said pivoted ribs to fold downwardly into the folded condition adjacent said mast, such that said sail is folded for storage.*

*50. A method of using a sunshade assembly, the method comprising:*

*extending a mast of the sunshade assembly upwardly from a supporting surface, the sunshade assembly further comprising a pair of pivoted ribs carried by the mast and configured to rotate relative to the supporting surface, and a sail having a proximal edge secured to each of the pivoted ribs and an unrestrained free edge opposite the proximate edge;*

*lifting the pivoted ribs outwardly from the mast at respective pivot points from a folded condition alongside the mast into an unfolded condition, such that in the unfolded condition the unrestrained free edge of the sail unfurls in response to blowing of the wind; and*

*when the sail is unfurled, enabling the sail and pivoted ribs to rotate together relative to the mast to a direction of the blowing wind.*

*51. The method according to claim 50, and comprising adjustably controlling rotation of the sail and pivoted ribs in response to blowing of the wind.*

*52. The method according to claim 50, and comprising lowering the pivoted ribs from the unfolded condition to the folded condition alongside the mast, thereby folding the sail for storage.*

* * * * *